(12) United States Patent
Kathirvel et al.

(10) Patent No.: US 10,043,401 B2
(45) Date of Patent: Aug. 7, 2018

(54) METHODS AND APPARATUS FOR DETECTING AIRPORT TERMINAL AREA CONGESTION

(71) Applicant: HONEYWELL INTERNATIONAL INC., Morris Plains, NJ (US)

(72) Inventors: Kannan Kathirvel, Tamil Nadu (IN); Patrick Mulhall, Scottsdale (AZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 177 days.

(21) Appl. No.: 15/156,745

(22) Filed: May 17, 2016

(65) Prior Publication Data
US 2017/0337828 A1 Nov. 23, 2017

(51) Int. Cl.
*G08G 5/00* (2006.01)
*G08G 5/02* (2006.01)

(52) U.S. Cl.
CPC ......... *G08G 5/0078* (2013.01); *G08G 5/0008* (2013.01); *G08G 5/0013* (2013.01); *G08G 5/0021* (2013.01); *G08G 5/025* (2013.01)

(58) Field of Classification Search
None
See application file for complete search history.

(56) References Cited

U.S. PATENT DOCUMENTS

| | | | |
|---|---|---|---|
| 5,164,904 A | 11/1992 | Sumner | |
| 6,148,179 A * | 11/2000 | Wright | G08G 5/0013 340/531 |
| 6,163,681 A * | 12/2000 | Wright | G08G 5/0013 340/945 |
| 6,314,362 B1 * | 11/2001 | Erzberger | G08G 5/0043 340/961 |
| 6,380,869 B1 * | 4/2002 | Simon | G08G 5/0013 340/945 |
| 6,473,003 B2 * | 10/2002 | Horvath | G01S 1/047 340/945 |
| 6,768,944 B2 * | 7/2004 | Breed | B60W 40/06 213/36 |
| 6,826,458 B2 * | 11/2004 | Horvath | G01C 23/00 244/1 R |

(Continued)

FOREIGN PATENT DOCUMENTS

EP 2648174 A2 10/2013
EP 2833561 A1 2/2015
(Continued)

OTHER PUBLICATIONS

Albasman, M. et al.; An Approach to Air Traffic Density Estimation and Its Application in Aircraft Trajectory Planning; 2012 24th Chinese Control and Decision Conference (CCDC).
(Continued)

*Primary Examiner* — Truc M Do
(74) *Attorney, Agent, or Firm* — Lorenz & Kopf, LLP (57) ABSTRACT

A method for evaluating landing conditions at an airport is provided. The method obtains, by an avionics system onboard a first aircraft, aircraft position data associated with a plurality of aircraft located within a range of the airport; and computes a terminal congestion coefficient for the airport, based on the aircraft position data, wherein the terminal congestion coefficient indicates a level of air traffic within the range of the airport.

19 Claims, 6 Drawing Sheets

(56) References Cited

U.S. PATENT DOCUMENTS

| | | | |
|---|---|---|---|
| 6,950,037 B1 | 9/2005 | Clavier et al. | |
| 8,203,465 B2 | 6/2012 | Shafaat et al. | |
| 8,554,458 B2* | 10/2013 | Sawhill | G08G 5/0013 |
| | | | 701/120 |
| 8,565,944 B1 | 10/2013 | Gershzohn | |
| 9,066,315 B2* | 6/2015 | Shimo | H04W 64/006 |
| 9,069,077 B2 | 6/2015 | Hartley et al. | |
| 9,087,449 B1* | 7/2015 | Munns | G08G 5/0004 |
| 9,257,048 B1* | 2/2016 | Offer | G08G 5/0021 |
| 9,423,799 B1* | 8/2016 | Wu | G05D 1/042 |
| 2002/0039072 A1* | 4/2002 | Gremmert | G01S 7/003 |
| | | | 340/945 |
| 2004/0030465 A1* | 2/2004 | Conner | G01S 19/15 |
| | | | 701/16 |
| 2005/0015202 A1* | 1/2005 | Poe | G08G 5/0008 |
| | | | 701/301 |
| 2006/0293840 A1* | 12/2006 | Klein | G08G 5/0095 |
| | | | 701/533 |
| 2007/0005550 A1* | 1/2007 | Klein | G08G 5/0095 |
| 2007/0222665 A1* | 9/2007 | Koeneman | G01S 13/9303 |
| | | | 342/29 |
| 2008/0228333 A1* | 9/2008 | De Menorval | G05D 1/0005 |
| | | | 701/14 |
| 2008/0275642 A1* | 11/2008 | Clark | G08G 5/0021 |
| | | | 701/457 |
| 2011/0224847 A1* | 9/2011 | Singer | G01C 23/00 |
| | | | 701/4 |
| 2013/0179059 A1* | 7/2013 | Otto | G06Q 10/06 |
| | | | 701/120 |
| 2013/0204523 A1* | 8/2013 | He | G01C 23/005 |
| | | | 701/527 |
| 2015/0228196 A1* | 8/2015 | Sampigethaya | G08G 5/0008 |
| | | | 701/120 |
| 2016/0063869 A1* | 3/2016 | Kathirvel | G08G 5/0043 |
| | | | 701/3 |
| 2016/0140854 A1* | 5/2016 | Enns | G08G 5/0008 |
| | | | 701/16 |

FOREIGN PATENT DOCUMENTS

| | | |
|---|---|---|
| EP | 2858061 A1 | 4/2015 |
| EP | 2991057 A2 | 3/2016 |
| EP | 3174029 A1 | 5/2017 |

OTHER PUBLICATIONS

Panmungmee, C. et al; Automatic Traffic Estimation System using Mobile Probe Vehicles; 2012 4th International Conference on Knowledge and Smart Technology (KST).

Klein, A. et al.; Utilizing Simplified Dynamic Density for Estimating Benefits of Nextgen Operational Concepts; 2010 Integrated Communications Navigation and Surveillance (ICNS) Conference May 11-13, 2010.

Extended EP Search Report for Application No. 17167160.5-1803 dated Sep. 29, 2017.

* cited by examiner

METHODS AND APPARATUS FOR DETECTING AIRPORT TERMINAL AREA CONGESTION

TECHNICAL FIELD

Embodiments of the subject matter described herein relate generally to analyzing air traffic near an airport to identify airport terminal area congestion. More particularly, embodiments of the subject matter relate to using aircraft transponder data to determine air traffic data for airport terminal area congestion analysis.

BACKGROUND

Terminal airspace and/or airport congestion and delays have been long term problems in the resource-constrained airspace system. Prevailing weather, runway conditions, and flight schedules of the day put constraints on terminal airspace resource utilization and forces airplanes into holding patterns. Requiring an airplane to maintain a position in the holding pattern reduces the efficiency of airline operations, and the airplane itself, through the resulting flight delays and excessive fuel burn.

Accordingly, it is desirable to provide a flight crew with information regarding a congested airport, which may result in spending an extended period of time in a holding pattern. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for evaluating landing conditions at an airport. The method obtains, by an avionics system onboard a first aircraft, aircraft position data associated with a plurality of aircraft located within a range of the airport; and computes a terminal congestion coefficient for the airport, based on the aircraft position data, wherein the terminal congestion coefficient indicates a level of air traffic within the range of the airport.

Some embodiments provide a system onboard an aircraft, for evaluating landing conditions at an airport. The system includes: a system memory element; an aircraft transponder, configured to receive a plurality of aircraft transponder broadcast messages transmitted from a plurality of aircraft located within a range of the airport; and at least one processor communicatively coupled to the system memory element and the aircraft transponder, the at least one processor configured to: determine aircraft position data associated with the plurality of aircraft located within a range of the airport, based on the plurality of aircraft transponder broadcast messages; and compute a terminal congestion coefficient for the airport, based on the aircraft position data, wherein the terminal congestion coefficient indicates a level of air traffic within the range of the airport.

Some embodiments provide a non-transitory, computer-readable medium containing instructions thereon, which, when executed by a processor, perform a method. The method receives, via a first transponder, a plurality of aircraft transponder messages comprising position data for a plurality of aircraft located in a range of an airport; computes, by an aircraft onboard computer system, a congestion coefficient for the airport; and determines congestion conditions associated with the airport, based on the congestion coefficient.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure presents methods and apparatus for detecting aircraft congestion for an airport, by a first aircraft, when the first aircraft is within a particular range of the airport. Landing conditions (e.g., congestion conditions) may be calculated using location parameters extracted from received transponder messages (e.g., Automatic Dependent Surveillance—Broadcast (ADS-B) messages) from a plurality of aircraft surrounding an airport, and in certain embodiments, an indication of airport congestion, or lack thereof, may be presented onboard the first aircraft.

Certain terminologies are used with regard to the various embodiments of the present disclosure. Aircraft position data extracted from received transponder messages may include, without limitation: range, altitude, speed, trajectory, or other indicators of a location of a particular aircraft in a three-dimensional (3D) scope airspace. Congested airspace, a congestion pattern, or heavy congestion in airspace associated with a particular airport indicates a high number of aircraft maintaining a position in a holding pattern or otherwise waiting to land at a particular landing zone (i.e., a particular runway or a particular airport). Congestion conditions may indicate a high level of congestion or a lack of congestion. A terminal congestion coefficient (TCC) is a metric indicating a computed average time spent by candidate aircraft converting from airborne to surface traffic. TCC is a "moving average", calculated over time, and is applicable to a specific landing zone (e.g., a specific runway and/or airport) with respect to a predefined range.

Figure 1:
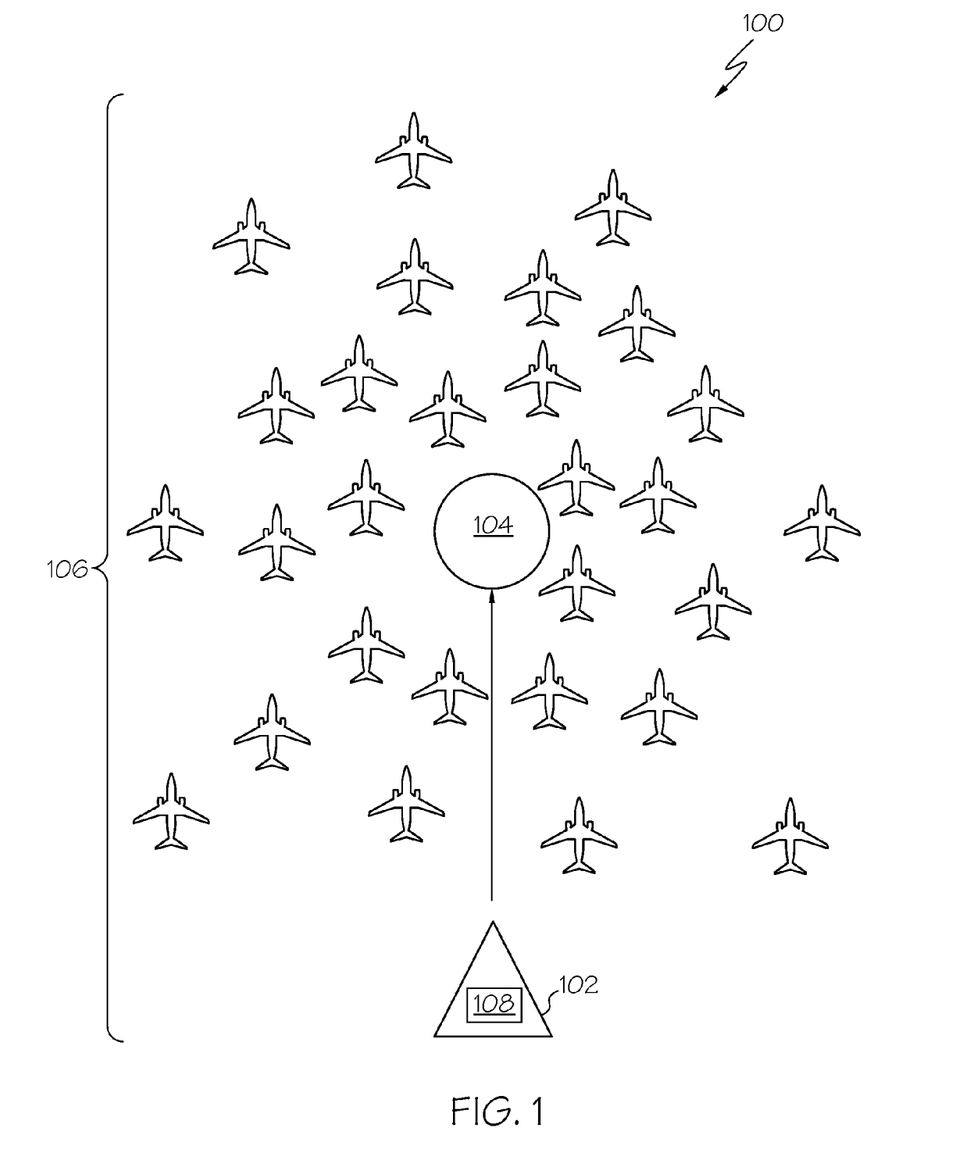
FIG. 1 is a diagram of a top-down view of congested airspace associated with an airport.

Turning now to the figures, FIG. 1 is a diagram of a top-down view of congested airspace 100 of an airport. As shown, a first aircraft 102 is traveling toward an airport 104. The first aircraft 102 may be implemented by any fixed-wing or rotary aircraft, such as an airplane, helicopter, space shuttle, drone, or other aircraft equipped with the capability to communicate with other aircraft (e.g., the plurality of aircraft 106) and ground control (e.g., the airport 104).

The first aircraft 102 is traveling toward the airport 104 through congested airspace that surrounds the airport 104 and includes a plurality of aircraft 106. It should be appreciated that any number of aircraft may be located in proximity to the airport 104, and that various positions and traveling directions may be used by the plurality of aircraft 106. In the scenario shown, due to the congestion at the airport 104, the first aircraft 102 will be required to maintain a position in a holding pattern as the first aircraft 102 waits for clearance from the airport 104 to land at the airport 104, rather than landing at the airport 104 as soon as the first aircraft 102 arrives. The first aircraft 102 may wait in the holding pattern for a short period of time or a longer period of time, depending on the number of the plurality of aircraft 106 that arrived at the airport 104 ahead of the first aircraft 102, and other appropriate landing conditions as defined by ground control at the airport 104. Maintaining a position in the holding pattern may result in delayed landing, and thus a delayed schedule which may result in future delayed flights, for the first aircraft 102. Additionally, to maintain a position in the holding pattern, the first aircraft 102 uses additional fuel to remain in the air until permitted to land.

Here, the first aircraft 102 is equipped with a congestion detection system 108, for identifying a level of congestion around the airport 104. The identified level of congestion around the airport 104 indicates whether the first aircraft 102 will be required to maintain a position in a holding pattern for a period of time, instead of landing at the airport 104 when the first aircraft 102 reaches the airport 104. The congestion detection system 108 may present a notification of congestion, or a notification of a lack of congestion, associated with the airspace surrounding the airport 104, such that a flight crew may use this information in determining whether to land at the particular airport 104.

Figure 2:
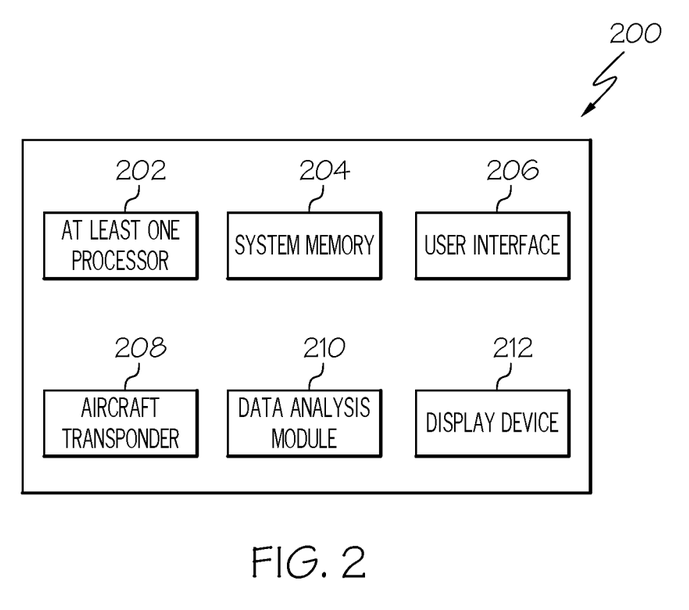
FIG. 2 is a functional block diagram of a congestion detection system for an airport terminal area.

FIG. 2 is a functional block diagram of a congestion detection system 200 for an airport terminal area. The congestion detection system 200 is generally implemented onboard an aircraft as part of one or more onboard avionics systems. In certain exemplary embodiments, the congestion detection system 200 may be implemented using a flight management system (FMS) onboard the aircraft. It should be noted that the congestion detection system 200 can be implemented with the congestion detection system 108 depicted in FIG. 1. In this regard, the congestion detection system 200 shows certain elements and components of the congestion detection system 108 in more detail.

The congestion detection system 200 generally includes, without limitation: at least one processor 202; system memory 204; a user interface 206; an aircraft transponder 208; a data analysis module 210; and display device 212 onboard the aircraft. These elements and features of the congestion detection system 200 may be operatively associated with one another, coupled to one another, or otherwise configured to cooperate with one another as needed to support the desired functionality—in particular, determining a level of aircraft congestion surrounding a particular airport, as described herein. For ease of illustration and clarity, the various physical, electrical, and logical couplings and interconnections for these elements and features are not depicted in FIG. 2. Moreover, it should be appreciated that embodiments of the congestion detection system 200 will include other elements, modules, and features that cooperate to support the desired functionality. For simplicity, FIG. 2 only depicts certain elements that relate to the detection of airport terminal congestion techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be used to store received aircraft transponder messages, parameter data extracted from aircraft transponder messages, and/or calculated airport congestion data. The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the congestion detection system 200. Accordingly, the user interface 206 may include various human-to-machine interfaces, e.g., a keypad, keys, a keyboard, buttons, switches, knobs, a touchpad, a joystick, a pointing device, CCD, a virtual writing tablet, a touch screen, a microphone, or any device, component, or function that enables the user to select options, input information, or otherwise control the operation of the congestion detection system 200. For example, the user interface 206 could be manipulated by an operator to request information related to congestion conditions for a particular airport or a particular runway.

In certain embodiments, the user interface 206 may include or cooperate with various features to allow a user to interact with the congestion detection system 200 via graphical elements rendered on a display element. Accordingly, the user interface 206 may initiate the creation, maintenance, and presentation of a graphical user interface (GUI). In certain embodiments, the display element implements touch-sensitive technology for purposes of interacting with the GUI. Thus, a user can manipulate the GUI by moving a cursor symbol rendered on the display element, or by physically interacting with the display element itself for recognition and interpretation, via the user interface 206.

The aircraft transponder 208 is configured to send and receive broadcast messages via transponder data link. The aircraft transponder 208 may be implemented using any transponder device which may transmit broadcast messages which may be received by other aircraft and/or a ground control center within a range of communication. Exemplary embodiments of the aircraft transponder 208 may be implemented using an Automatic Dependent Surveillance—Broadcast (ADS-B), including an ADS-B Out transmitter and an ADS-B In receiver. The ADS-B Out transmitter (located onboard the aircraft) periodically broadcasts information about each aircraft, to include, without limitation: aircraft identification, current aircraft position, altitude, and/or velocity. The ADS-B Out broadcast messages of a plurality of aircraft around a particular airport and/or a particular runway (as described above with regard to FIG. 1) provide real-time position information, which may be received via an ADS-B In receiver of a first aircraft using the congestion detection system 200. The first aircraft may retain, store, and interpret the received ADS-B messages to determine congestion conditions for a particular landing zone (e.g., a particular airport, a particular runway, etc.). The aircraft transponder 208 may receive transponder messages transmitted from other aircraft and/or a ground control station within transmission range. In other words, the aircraft transponder 208 may receive transponder messages via aircraft-to-aircraft communication and/or ground control-to-aircraft communication.

The data analysis module 210 is configured to perform calculations to determine congestion conditions at a particular landing zone (e.g., a particular airport and/or a particular runway). To perform these calculations, the data analysis module 210 uses input parameters extracted from received aircraft transponder messages (received via the aircraft transponder 208) to identify aircraft located near the particular landing zone, to calculate individual traffic attitude for the identified aircraft, to narrow the group of candidate aircraft by determining which of the identified aircraft are decreasing in altitude, slowing down, and reducing a distance between the airport and itself. For the candidate aircraft, the data analysis module 210 calculates moving average time value which indicates congestion conditions at the particular landing zone.

In embodiments where the congestion detection system 200 is implemented as an FMS, the determined congestion conditions (e.g., a congestion coefficient) are used to optimize the FMS predictions for landing and to enable the FMS to fly the airplane using optimal speed and altitude, such that airplane wait time around the terminal airspace is reduced. Thus, the determined congestion conditions or congestion coefficient is sued to refine the predictions and flight plan parameters to minimize the time spent by the first aircraft in a holding pattern waiting to land at the airport.

In practice, the data analysis module 210 may be implemented with (or cooperate with) the at least one processor 202 to perform at least some of the functions and operations described in more detail herein. In this regard, the data analysis module 210 may be realized as suitably written processing logic, application program code, or the like.

The display device 212 is configured to display various icons, text, and/or graphical elements associated with congestion conditions at a particular landing zone (as determined by the data analysis module 210). In an exemplary embodiment, the display device 212 is communicatively coupled to the user interface 206 and the at least one processor 202. The at least one processor 202 and the user interface 206 are cooperatively configured to display, render, or otherwise convey one or more graphical representations or images associated with congestion conditions on the display device 212, as described in greater detail below. In an exemplary embodiment, the display device 212 is realized as an electronic display configured to graphically display an indication of a congestion pattern or an indication of a lack of a congestion pattern. In some embodiments, the display device 212 is located within a cockpit of the aircraft. It will be appreciated that although the display device 212 may be implemented using a single aircraft display device 212, certain embodiments may use additional display devices to accomplish the functionality of the display device 212 described herein.

Figure 3:
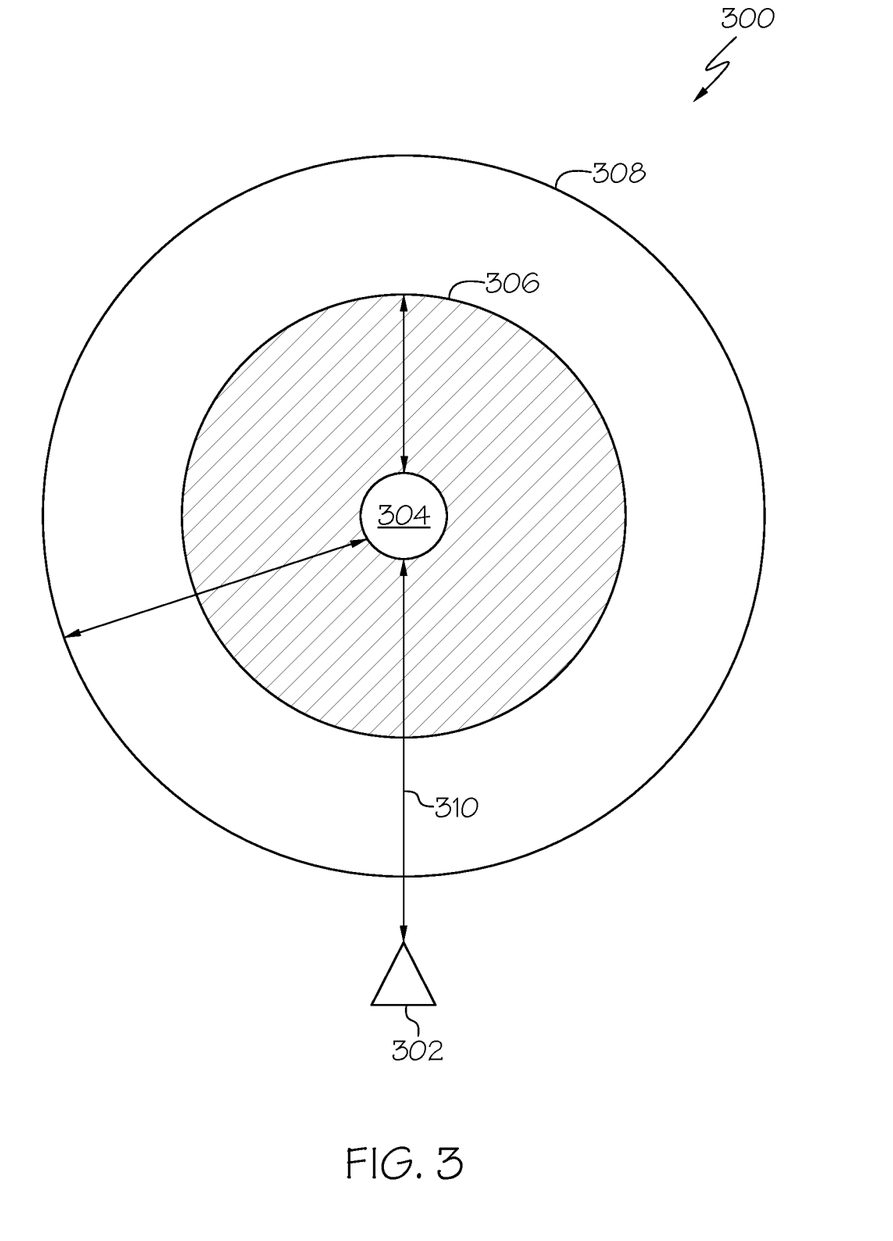
FIG. 3 is a diagram of another top-down view of airspace associated with an airport.

FIG. 3 is a diagram of another top-down view of airspace 300 associated with an airport. Similar to FIG. 1, FIG. 3 illustrates a scope of airspace 300 surrounding an airport 304, and a first aircraft 302 traveling toward the airport 304 through the scope of airspace 300. As shown, the airspace 300 surrounds an airport 304, and includes two defined portions: (i) a terminal airspace 306, and (ii) a congestion conditions prediction range 308. Each portion is a defined scope of the airspace surrounding the airport 304. The terminal airspace 306 is a predefined scope of airspace that is associated with a particular airport 304. The congestion conditions prediction range 308 is generally a user-selected range from which the first aircraft 302 performs computations to determine congestion conditions at the airport 304.

As the first aircraft 302 travels toward the airport 304, the first aircraft 302 receives aircraft transponder broadcast messages from other aircraft within a transponder transmission range 310. Position data for each individual aircraft (detected by the first aircraft 302 via received transponder messages) is extracted from each received transponder message. Using a congestion detection system (described previously with regard to FIGS. 1-2), and the extracted position data, the first aircraft 302 performs calculations to determine a congestion pattern (or lack of a congestion pattern) in the congestion conditions prediction range 308 around the airport 304. Using the determined congestion condition data, the first aircraft 302 is able to select a runway associated with a low congestion level for landing; reduce ground speed of the first aircraft 302 such that the first aircraft 302 avoids participating in a holding pattern; make early decisions to avoid adverse weather; make more informed predictions of flight endurance and thus make appropriate requests to ground control; and more accurately predict an estimated time of arrival (ETA).

The congestion conditions prediction range 308 may be selected by the user or system-automated to select a range around the terminal airspace 306 (i.e., airport) to sample the ADS-B targets for calculating a terminal congestion coefficient (TCC). A user could change this range to change the sampling done for lower or higher resolution profiles. If the user is located at a greater distance from the airport, the user may choose a larger congestion conditions prediction range 308 than a smaller range for which being closer to the airport would be suitable.

Figure 4:
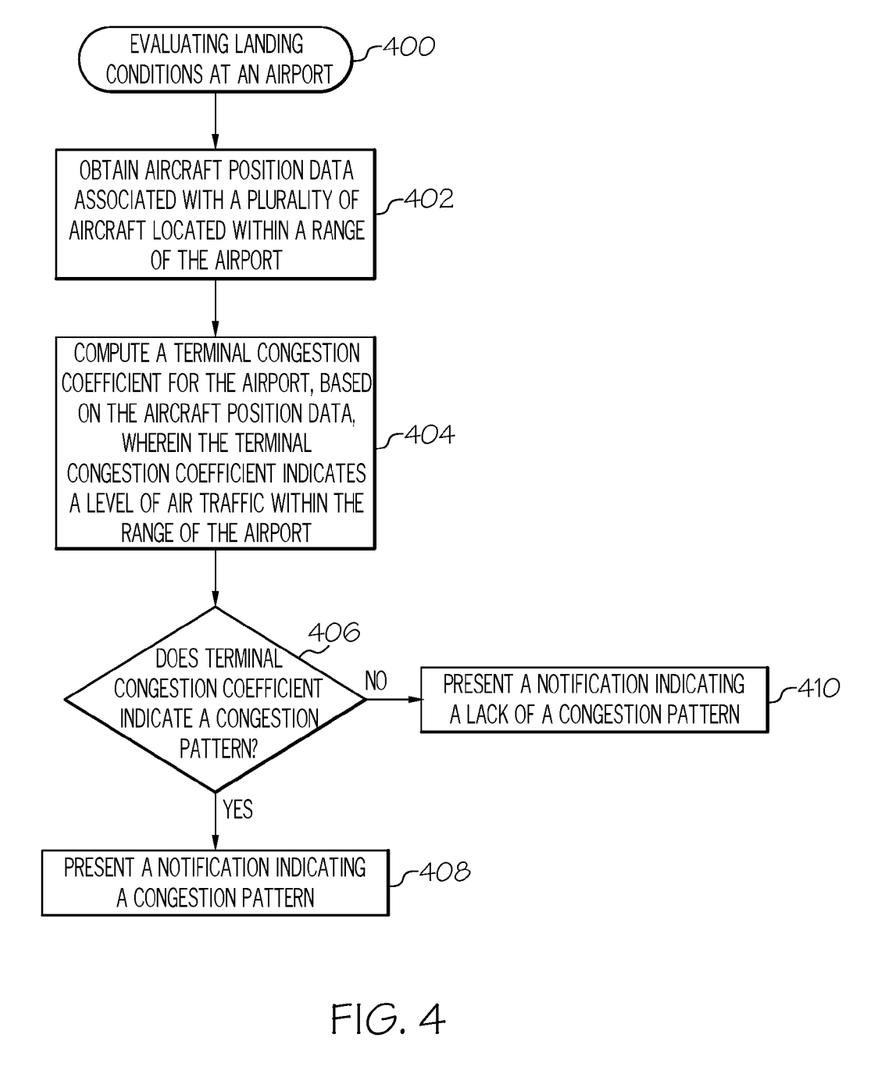
FIG. 4 is a flow chart that illustrates an embodiment of a process for evaluating landing conditions at an airport.

FIG. 4 is a flow chart that illustrates an embodiment of a process 400 for evaluating landing conditions at an airport.

The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For ease of description and clarity, it is assumed that the process 400 begins by obtaining, by an avionics system onboard a first aircraft, aircraft position data associated with a plurality of aircraft located within a range of the airport (step 402). One suitable methodology for obtaining aircraft position data is described below with reference to FIG. 5. Aircraft position data may include, without limitation: range, altitude, speed, trajectory, or other indicators of a location of a particular aircraft in a three-dimensional (3D) scope airspace. Aircraft position data is used to determine which subset of aircraft, of the group of aircraft transmitting the transponder messages, is located within a predefined range or scope of airspace associated with a particular airport. Aircraft position data may also be used to determine which of the identified subset are landing at the airport (as opposed to flying over and/or flying away from the airport). Each parameter used is defined in the standard for ADS-B (RTCA DO-317). The ADS-B broadcasting range is the distance from a first aircraft to broadcasting aircraft which transmitted the ADS-B message. The altitude and speed parameters are absolute with respect to a broadcasting aircraft.

Next, the process 400 computes a terminal congestion coefficient for the airport, based on the aircraft position data, wherein the terminal congestion coefficient indicates a level of air traffic within the range of the airport (step 404). One suitable methodology for computing a terminal congestion coefficient is described below with reference to FIG. 6. Here, the process 400 calculates a TCC value using the obtained values for the aircraft position data. TCC is a metric indicating a computed average time spent by candidate aircraft converting from airborne to surface traffic. TCC is a "moving average", calculated over time, and is applicable to a specific landing zone (e.g., a specific runway and/or airport) with respect to a predefined range. TCC enables prediction of the amount of time spent by an aircraft in the terminal airspace around a particular airport, and TCC is directly proportional to the congestion pattern (or lack thereof) around the particular airport.

In certain embodiments, the process 400 then presents the terminal congestion coefficient (TCC), via an aircraft onboard display, such that a flight crew may interpret and use the TCC as appropriate. In other embodiments, however, the process 400 interprets the computed TCC to determine whether the TCC indicates a congestion pattern (decision 406). In some embodiments, a numerical value for TCC is compared to a predefined threshold, to determine whether TCC indicates a congestion pattern. When TCC exceeds the predefined threshold, then TCC indicates a congestion pattern or, in other words, TCC indicates heavy, congested traffic surrounding the particular landing zone, where a first aircraft would likely be required to maintain a position in a holding pattern for an extended period of time. When TCC is less than the predefined threshold, then TCC indicates a lack of a congestion pattern, or any condition that is less than heavy, congested traffic. In some embodiments, a TCC value that is less than the predefined threshold may indicate free-flowing traffic, and an opportunity for the first aircraft to land immediately or very quickly. In other embodiments, however, a TCC value that is less than the predefined threshold may indicate a "reasonable" amount of traffic indicating a short enough window of time for the first aircraft to land at the landing zone, without spending an excessive amount of time in a holding pattern waiting to land.

When the process 400 determines that the terminal congestion coefficient indicates a congestion pattern (the "Yes" branch of 406), the process 400 presents a notification indicating a congestion pattern (step 408). However, when the process 400 determines that the terminal congestion coefficient does not indicate a congestion pattern (the "No" branch of 406), the process 400 presents a notification indicating a lack of a congestion pattern (step 410). Each of the notifications described with respect to steps 408 and 410 may be presented onboard an aircraft via aircraft display device. Here, the process 400 presents notifications so that the flight crew may make appropriate landing decisions based on a likelihood that the first aircraft would, or would not, spend an excessive amount of time in a holding pattern. Thus, the flight crew may decide to continue plans to land at the particular landing zone, or may determine that landing at another location is a better option.

Figure 5:
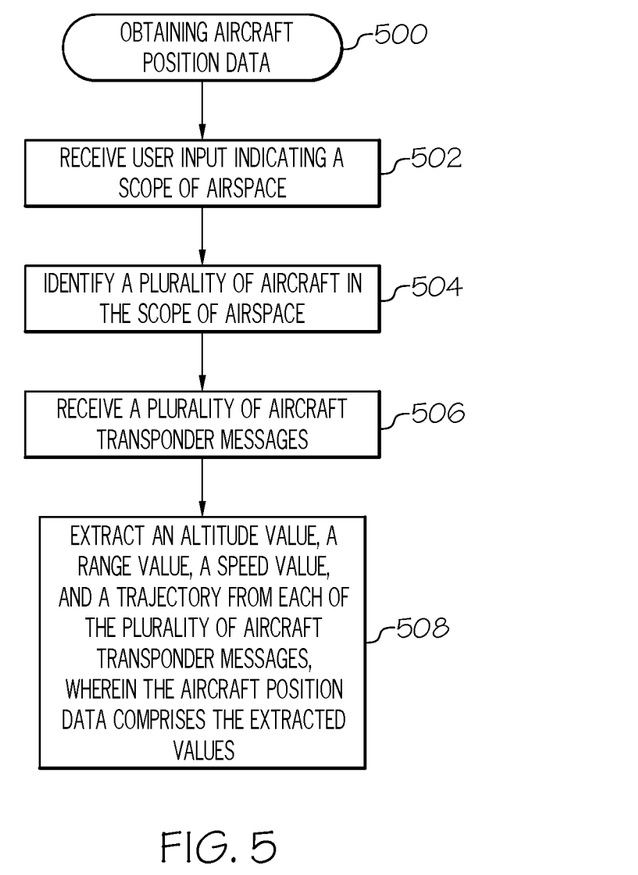
FIG. 5 is a flow chart that illustrates an embodiment of a process for obtaining aircraft position data.

FIG. 5 is a flow chart that illustrates an embodiment of a process 500 for obtaining aircraft position data. It should be appreciated that the process 500 described in FIG. 5 represents one embodiment of step 402 described above in the discussion of FIG. 4, including additional detail. First, the process 500 receives user input indicating a scope of airspace (step 502). The process 500 generally receives the user input scope via a user interface and/or aircraft display device, such as a multi-function display (MFD) or navigation display (ND). The scope of airspace extends from the designated runway in the airport and includes the entire flight path profile which the first aircraft (using the process 500) is using for landing. Here, the scope includes two factors: (1) the range from the airport, and (2) an airport which is of interest to the pilot.

Next, the process 500 identifies a plurality of aircraft in the scope of airspace (step 504). Here, the process 500 evaluates aircraft transponder messages broadcast from all aircraft within a transponder transmission range to identify transponder transmissions originating from aircraft in the user-selected scope of airspace. The process 500 identifies aircraft in the defined scope of airspace using location information from the received transponder messages. Here, the scope of airspace (identified in step 502) defines a selection region that presumably encompasses the airport environment (terminal airspace) and hence traffic targets (i.e., the plurality of aircraft) within that region.

The process 500 receives a plurality of aircraft transponder messages (step 506). In certain embodiments, the plurality of aircraft transponder messages may be transmitted from the plurality of aircraft. However, in other embodiments, the plurality of aircraft transponder messages may be received from one or more ground systems (e.g., air traffic control, etc.) In exemplary embodiments of the process 500, the process 500 receives aircraft transponder messages from all aircraft within an aircraft transponder transmission range, and identifies transponder messages from the identified plurality of aircraft in the defined scope of airspace, for further use. It should be appreciated, however, that other embodiments of the process 500 may limit received transponder messages to those applicable to the defined scope of airspace and/or filter transponder messages to retain those transponder messages applicable to the defined scope of airspace.

The process 500 extracts an altitude value, a range value, a speed value, and a trajectory from each of the plurality of aircraft transponder messages, wherein the aircraft position data comprises the extracted values (step 508). At a minimum, range, bearing, and time-based-changes for the altitude value, the range value, and the speed value, are used for calculation of broadcasting aircraft position relative to the first aircraft. However, some ADS-B transmitted messages can include a global positioning service (GPS) position if the broadcasting equipment supplies it. In either case, the process 500 tracks each target to determine changes in time. Likewise altitude, or "altitude sense", is determined by a combination of broadcasted message data and ownship tracking for the first aircraft performing the process 500.

Figure 6:
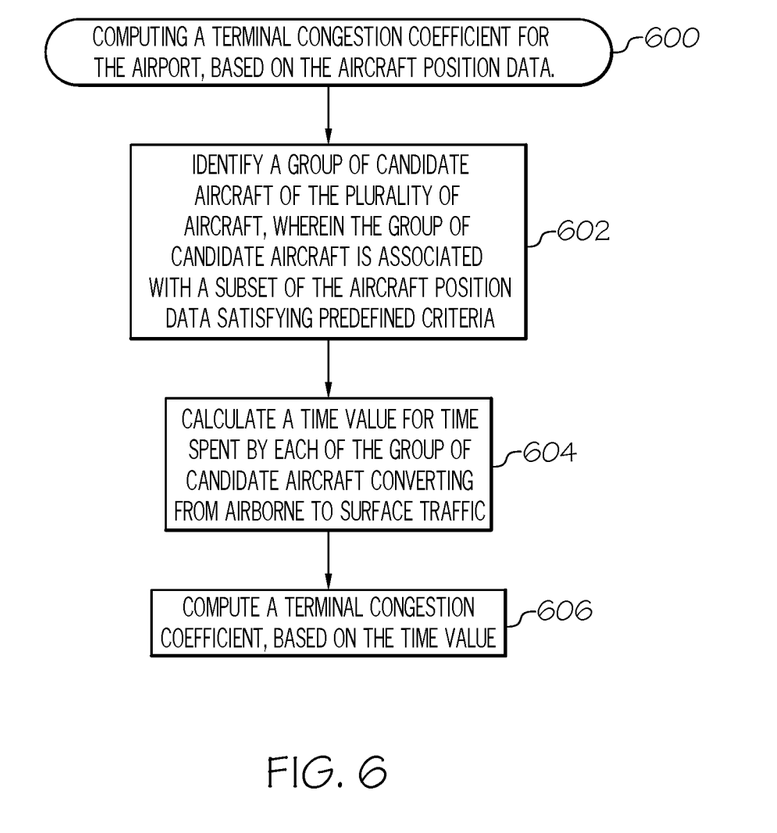
FIG. 6 is a flow chart that illustrates an embodiment of a process for computing a terminal congestion coefficient for an airport, based on aircraft position data.

FIG. 6 is a flow chart that illustrates an embodiment of a process 600 for computing a terminal congestion coefficient for an airport, based on aircraft position data. It should be appreciated that the process 600 described in FIG. 6 represents one embodiment of step 404 described above in the discussion of FIG. 4, including additional detail. First, the process 600 identifies a group of candidate aircraft of the plurality of aircraft, wherein the group of candidate aircraft is associated with a subset of the aircraft position data satisfying predefined criteria (step 602). The plurality of aircraft is a group of aircraft located within a range of the airport. Here, the process 500 identifies a subset of the group of aircraft located within the range, by evaluating changes in attitude for each of the individual aircraft. The predefined criteria comprise these changes in attitude, and the changes in attitude may include, without limitation: an altitude growth factor ($T_a$), a rate of increase in ground speed ($T_s$), and an increase in distance between traffic and airport periphery ($T_d$).

The process 600 then selects candidate traffic ($T_{candidate}$) which meet the following criteria: (1) a negative $T_a$ value, indicating a decrease in altitude for each individual aircraft; (2) a negative $T_s$ value, indicating that the individual aircraft is slowing down; and (3) a reducing $T_d$ value, indicating a closing distance between the airport and an individual aircraft. Here, the process 600 takes a "snapshot" of data for each set of aircraft transponder messages received. In certain embodiments, aircraft transponder messages from the candidate aircraft ($T_{candidate}$) are received every second, every two seconds, or every three seconds. However, in some embodiments the timed interval between snapshots of data may be greater or lesser than the exemplary embodiment of a one-second timed interval.

Using these snapshots of data, which include aircraft position data extracted from the transponder messages received according to the applicable timed interval, the process 600 computes changes between a first value at a first time to a second value at a second time. For example, the process 600 will use a first transponder message received at a first time x and a second transponder message received at a second time x+1 second. The process 600 detects a first altitude, a first ground speed, and a first range (i.e., distance) between the individual aircraft an airport periphery, using the first transponder message or, in other words, using the first "snapshot". The process 600 then detects a second altitude, a second ground speed, and a second range between the individual aircraft and airport periphery, using the second transponder message (i.e., second snapshot). The process 600 computes change values, or deltas (Δ) between each value, resulting in an altitude growth factor ($T_a$), a rate of increase of ground speed ($T_s$), and a value ($T_d$) for the increase in distance between an individual aircraft and airport periphery. The $T_a$, $T_s$, and $T_d$ values are computed for each individual aircraft at each timed interval for a period of time, resulting in vectors over time, which may be evaluated to assess the candidacy of each individual aircraft.

Next, the process 600 calculates a time value ($P_{time}$) for time spent by each of the group of candidate aircraft ($T_{candidate}$) converting from airborne to surface traffic (step 604). The process 600 calculates $P_{time}$ by forming a track of each target within the $P_r$ region. Tracking means keeping a real time record, and continually updating with changes, the target location/speed/altitude.

The process 600 then computes a terminal congestion coefficient (TCC) based on the time value (step 606). TCC is a metric indicating a computed average time spent by candidate aircraft converting from airborne to surface traffic. TCC is a "moving average", calculated over time, and is applicable to a specific landing zone (e.g., a specific runway and/or airport) with respect to a predefined range. TCC enables prediction of the amount of time spent by an aircraft in the terminal airspace around a particular airport, and TCC is directly proportional to the congestion pattern (or lack thereof) around the particular airport.

The TCC value is computed using the following formula:

$$TCC_{n+1} = TCC_n + \frac{P_{time(n+1)} - TCC_n}{n+1},$$

where $TCC_{n+1}$ is a cumulative average of the terminal congestion factor with n+1 candidate traffic, where $TCC_n$ is the average TCC with n number of traffic, and where $P_{time(n+1)}$ is the time spent by candidate traffic n+1. The reliability and accuracy of TCC is determined by the number of candidate traffic ($T_{candidate}$) involved in calculating the average. Using candidate traffic count (n) greater than ten (10) traffic ensures a more reliable TCC calculation. The confidence or reliability of TCC is based on several factors: the number of sample aircraft, the time of sampling and correlation to prediction, the confidence and reliability of the ADS-B data, TCC ETA Ratio (Estimated Time of Arrival) provided by a flight management system (FMS), or the like. The TCC ETA Ratio would reflect the current FMS ETA and TCC ETA. If the two are the same then ideally FMS is on track for optimal approach.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for evaluating landing conditions at an airport, the method comprising:
   obtaining, by an avionics system onboard a first aircraft, aircraft position data associated with a plurality of aircraft located within a range of the airport; and
   computing a terminal congestion coefficient for the airport, based on the aircraft position data, by:
      identifying a group of candidate aircraft of the plurality of aircraft, wherein the group of candidate aircraft is associated with a subset of the aircraft position data satisfying predefined criteria;
      calculating a first time value for time spent by each of the group of candidate aircraft converting from airborne to surface traffic, and a second time value for time spent by each of the group of candidate aircraft in the range; and
      computing a terminal congestion coefficient, based on the first time value and the second time value;
      wherein the terminal congestion coefficient indicates a level of air traffic within the range of the airport.

2. The method of claim 1, wherein obtaining the aircraft position data further comprises:
   receiving a plurality of aircraft transponder broadcast messages; and
   determining the aircraft position data, based on the plurality of aircraft transponder messages.

3. The method of claim 2, further comprising receiving the plurality of aircraft transponder messages transmitted from the plurality of aircraft.

4. The method of claim 2, further comprising receiving the plurality of aircraft transponder messages transmitted from one or more ground systems.

5. The method of claim 2, wherein determining the aircraft position data further comprises extracting an altitude value, a range value, a speed value, and a trajectory from each of the plurality of aircraft transponder broadcast messages; and
   wherein the aircraft position data comprises the altitude value, the range value, the speed value, and the trajectory for each of the plurality of aircraft in the range.

6. The method of claim 1, wherein obtaining aircraft position data further comprises:
   receiving user input indicating a scope of airspace; and
   identifying the plurality of aircraft in the scope of airspace, wherein the range comprises the scope of airspace.

7. The method of claim 1, further comprising:
   determining whether the terminal congestion coefficient indicates a congestion pattern; and when the terminal congestion coefficient indicates a congestion pattern, presenting a congestion pattern notification.

8. A system onboard an aircraft, for evaluating landing conditions at an airport, the system comprising:
a system memory element;
an aircraft transponder, configured to receive a plurality of aircraft transponder broadcast messages transmitted from a plurality of aircraft located within a range of the airport; and
at least one processor communicatively coupled to the system memory element and the aircraft transponder, the at least one processor configured to:
determine aircraft position data associated with the plurality of aircraft located within a range of the airport, based on the plurality of aircraft transponder broadcast messages;
compute a terminal congestion coefficient for the airport, based on the aircraft position data, by:
identifying a group of candidate aircraft of the plurality of aircraft, wherein the group of candidate aircraft is associated with a subset of the aircraft position data satisfying predefined criteria;
calculating a first time value for time spent by each of the group of candidate aircraft converting from airborne to surface traffic, and a second time value for time spent by each of the group of candidate aircraft in the range; and
computing a terminal congestion coefficient, based on the first time value and the second time value;
wherein the terminal congestion coefficient indicates a level of air traffic within the range of the airport; and
determine an optimal speed value and an optimal altitude value, based on the terminal congestion coefficient.

9. The system of claim 8, wherein the at least one processor is further configured to extract an altitude value, a range value, and a speed value from each of the plurality of aircraft transponder broadcast messages; and
wherein the aircraft position data comprises the altitude value, the range value, and the speed value for the plurality of aircraft in the user-selected range.

10. The system of claim 8, further comprising a Flight Management System (FMS) communicatively coupled to the system memory element and the aircraft transponder, wherein the FMS comprises the at least one processor;
wherein the at least one processor is further configured to optimize FMS predictions for landing, based on the terminal congestion coefficient, to reduce wait time in terminal airspace.

11. The system of claim 8, wherein the aircraft transponder comprises an Automatic Dependent Surveillance Broadcast (ADS-B) unit.

12. The system of claim 8, wherein the system further comprises an aircraft onboard display communicatively coupled to the at least one processor; and
wherein the aircraft onboard display is configured to present the terminal congestion coefficient.

13. The system of claim 8, further comprising a user interface communicatively coupled to the at least one processor, wherein the user interface is configured to receive user input indicating a scope of airspace; and
wherein the at least one processor is further configured to identify the plurality of aircraft in the scope of airspace, and wherein the range comprises the scope of airspace.

14. The system of claim 8, wherein the at least one processor is further configured to determine whether the terminal congestion coefficient indicates a congestion pattern;
wherein the system further comprises an aircraft onboard display communicatively coupled to the at least one processor; and
wherein the aircraft onboard display is configured to present a congestion pattern notification, when the terminal congestion coefficient indicates a congestion pattern.

15. The system of claim 8, wherein the at least one processor is further configured to determine whether the terminal congestion coefficient indicates a congestion pattern;
wherein the system further comprises an aircraft onboard display communicatively coupled to the at least one processor; and
wherein the aircraft onboard display is configured to present a lack of congestion notification, when the terminal congestion coefficient does not indicate a congestion pattern.

16. A non-transitory, computer-readable medium containing instructions thereon, which, when executed by a processor, perform a method comprising:
receiving, via a first transponder, a plurality of aircraft transponder messages comprising position data for a plurality of aircraft located in a range of an airport;
computing, by an aircraft onboard computer system, a congestion coefficient for the airport, by:
identifying a group of candidate aircraft of the plurality of aircraft, wherein the group of candidate aircraft is associated with a subset of the aircraft position data satisfying predefined criteria;
calculating a first time value for time spent by each of the group of candidate aircraft converting from airborne to surface traffic, and a second time value for time spent by each of the group of candidate aircraft in the range; and
computing the congestion coefficient, based on the first time value and the second time value, wherein the congestion coefficient indicates a level of air traffic within the range of the airport; and
determining congestion conditions associated with the airport, based on the congestion coefficient.

17. The non-transitory, computer-readable medium of claim 16, wherein determining the congestion conditions further comprises:
comparing the congestion coefficient to a predefined threshold; and
when the congestion coefficient is more than the predefined threshold, determining that the congestion coefficient indicates heavy congestion at the airport, wherein the congestion conditions comprise the heavy congestion.

18. The non-transitory, computer-readable medium of claim 16, wherein determining the congestion conditions further comprises:
comparing the congestion coefficient to a predefined threshold; and
when the congestion coefficient is less than the predefined threshold, determining that the congestion coefficient indicates a lack of congestion at the airport, wherein the congestion conditions comprise the lack of congestion.

19. The non-transitory, computer-readable medium of claim 16, wherein computing the congestion coefficient further comprises:

identifying a group of candidate aircraft of the plurality of aircraft, wherein the group of candidate aircraft is associated with a subset of the aircraft position data satisfying predefined criteria;

calculating a time value for time spent by each of the group of candidate aircraft converting from airborne to surface traffic; and computing a terminal congestion coefficient, based on the time value.

* * * * *